(12) United States Patent
Wen et al.

(10) Patent No.: US 8,423,340 B2
(45) Date of Patent: Apr. 16, 2013

(54) SYSTEM AND METHOD FOR CHANNEL EMULATOR PERFORMANCE MEASUREMENT AND EVALUATION

(75) Inventors: Zhu Wen, Beijing (CN); Hongwei Kong, Beijing (CN); Ya Jing, Beijing (CN); Xu Zhao, Beijing (CN)

(73) Assignee: Agilent Technologies, Inc., Santa Clara, CA (US)

( * ) Notice: Subject to any disclaimer, the term of this patent is extended or adjusted under 35 U.S.C. 154(b) by 658 days.

(21) Appl. No.: 12/204,823

(22) Filed: Sep. 5, 2008

(65) Prior Publication Data

US 2010/0063791 A1 Mar. 11, 2010

(51) Int. Cl.
G06F 17/50 (2006.01)

(52) U.S. Cl.
USPC ............................................. 703/13; 375/148

(58) Field of Classification Search ................... 703/13; 375/148
See application file for complete search history.

(56) References Cited

U.S. PATENT DOCUMENTS

| | | | | |
|---|---|---|---|---|
| 5,905,962 | A * | 5/1999 | Richardson | 455/522 |
| 7,013,257 | B1 * | 3/2006 | Nolan et al. | 703/28 |
| 2006/0153283 | A1 * | 7/2006 | Scharf et al. | 375/148 |
| 2008/0075184 | A1 * | 3/2008 | Muharemovic et al. | 375/260 |

OTHER PUBLICATIONS

Peerapong Uthansakul, Konstanty Bialkowski, Marek Bialkowski, Adam Postula, "Assessing an FPGA Implemented MIMO Testbed With the Use of Channel Emulator" Microwaves, Radar & Wireless Communications, 2006, Oct. 15, 2007, 4 pages.*

Konstanty S. Bialkowski, Peerapong Uthansakul, Marek E. Bialkowski and Adam Postula, "Design of MIMO Testbed with an FPGA Board for Fast Signal Processing", University of Queensland, School of Information Technology, 2006 Auswireless conference, 6 pages.*

Casas, E.; Leung, C.; A simple digital fading simulator for mobile radio.Vehicular Technology, IEEE Transactions on , vol. 39, Issue 3, Aug. 1990 pp. 205-212.

R. C. Heimiller, "Phase shift pulse codes with good periodic correlation properties", IRE Trans. on Inform. Theory, vol. 7, Issue 4, Oct. 1961 pp. 254-257.

R. L. Frank and S. A. Zadoff, "Phase shift pulse codes with good periodic correlation properties (Corresp.)," IRE Trans. on Inform. Theory , vol. IT-8, pp. 381-382, Oct. 1962.

D.C. Chu, "Polyphase codes with good periodic correlation properties", IRE Trans. on Inform. Theory, vol. 18, Issue 4, Jul. 1972 pp. 531-532.

* cited by examiner

Primary Examiner — Dwin M Craig

(57) ABSTRACT

A system and method for determining the performance of a channel emulator includes an input signal, at least one transmitter configured to receive the input signal, the at least one transmitter coupled to at least one receiver through the channel emulator, the at least one transmitter configured to transmit the input signal through the channel emulator, the at least one receiver configured to receive a faded receive signal. The system also comprises a signal processor configured to receive a processor signal and the faded receive signal, the signal processor configured to correlate the processor signal and the faded receive signal to develop a correlated signal that represents a channel impulse of the channel emulator. The channel impulse of the channel emulator is used to extract at least one channel coefficient that reflects the performance of the channel emulator.

20 Claims, 12 Drawing Sheets

SYSTEM AND METHOD FOR CHANNEL EMULATOR PERFORMANCE MEASUREMENT AND EVALUATION

BACKGROUND

A channel emulator is used to simulate channel effects that radio signals will undergo when propagating across a communication channel. The communication channel can be a wired or wireless communication channel. For a wireless communication channel, the channel effects are one of the most important factors to be considered when designing and implementing the communication channel.

For a radio channel, its radio propagation parameters are constantly changing and are influenced by a number of factors including, for example, location, temperature, the presence of interfering signals, the topography of the surrounding environment, etc. Because of the constantly changing channel parameters, it is difficult to develop a channel emulator that can repeat the same test under the same conditions in a real radio propagation environment. For system performance testing, a controllable channel emulator, which can accurately simulate radio propagation parameters, is highly desired.

For any particular wireless communication standard, specific channel models are used to conduct the performance testing of the wireless communication system which is designed to operate following the same standard. For a real-time test, a channel emulator, which can realize that standard in real-time, is used to perform the system performance and conformance test. Since a channel emulator is an important tool for testing the performance of a communication channel, it is important to have the ability to verify the accuracy and validity of the channel emulator.

When a radio signal propagates over the air, the signal will undergo many effects, such as multipath impairment, large and small scale fading, and other channel impairments which can change over time, location, etc. For example, multipath impairment causes a radio signal to appear as if it traverses different paths, which induces different path delay and pass loss for each path. A channel emulator attempts to simulate all of these channel impairments in order to simulate actual signal propagation parameters. The channel emulator develops what is referred to as a "faded signal" that is intended to represent a signal that has traversed a communication channel having one or more of the above-mentioned impairments. The performance of the channel emulator is based on statistics of communication channel models.

The influence of the channel impairments on the faded signal should be evaluated as a whole when evaluating the performance of a channel emulator. Performance testing a channel emulator is challenging based on a number of factors. Most importantly, there are no well-accepted standard performance metrics or methods to evaluate the performance of a channel emulator. For example, the faded signal provided by the channel emulator changes over time following one or more statistical models, making it difficult to directly measure the faded signal. For example, multiple path fading will result in the spectrum changing over time. There is no straightforward way to evaluate whether such a change is properly represented by the faded signal provided by the channel emulator.

Therefore, it is desirable to have a simple and accurate way to verify the accuracy and validity of the performance of a channel emulator.

SUMMARY

An embodiment of a system and method for determining the performance of a channel emulator comprises an input signal and at least one transmitter configured to receive the input signal. The at least one transmitter is coupled to at least one receiver through the channel emulator. The at least one transmitter is configured to transmit the input signal through the channel emulator and the at least one receiver is configured to receive a faded receive signal. The system also comprises a signal processor configured to receive a processor signal and the faded receive signal. The signal processor is configured to correlate the processor signal and the faded receive signal to develop a correlated signal that represents a channel impulse of the channel emulator. The channel impulse of the channel emulator is used to extract at least one channel coefficient that reflects the performance of the channel emulator.

Other embodiments and methods of the invention will be discussed with reference to the figures and to the detailed description.

BRIEF DESCRIPTION OF THE FIGURES

The invention will be described by way of example, in the description of exemplary embodiments, with particular reference to the accompanying figures.

DETAILED DESCRIPTION

Figure 1:
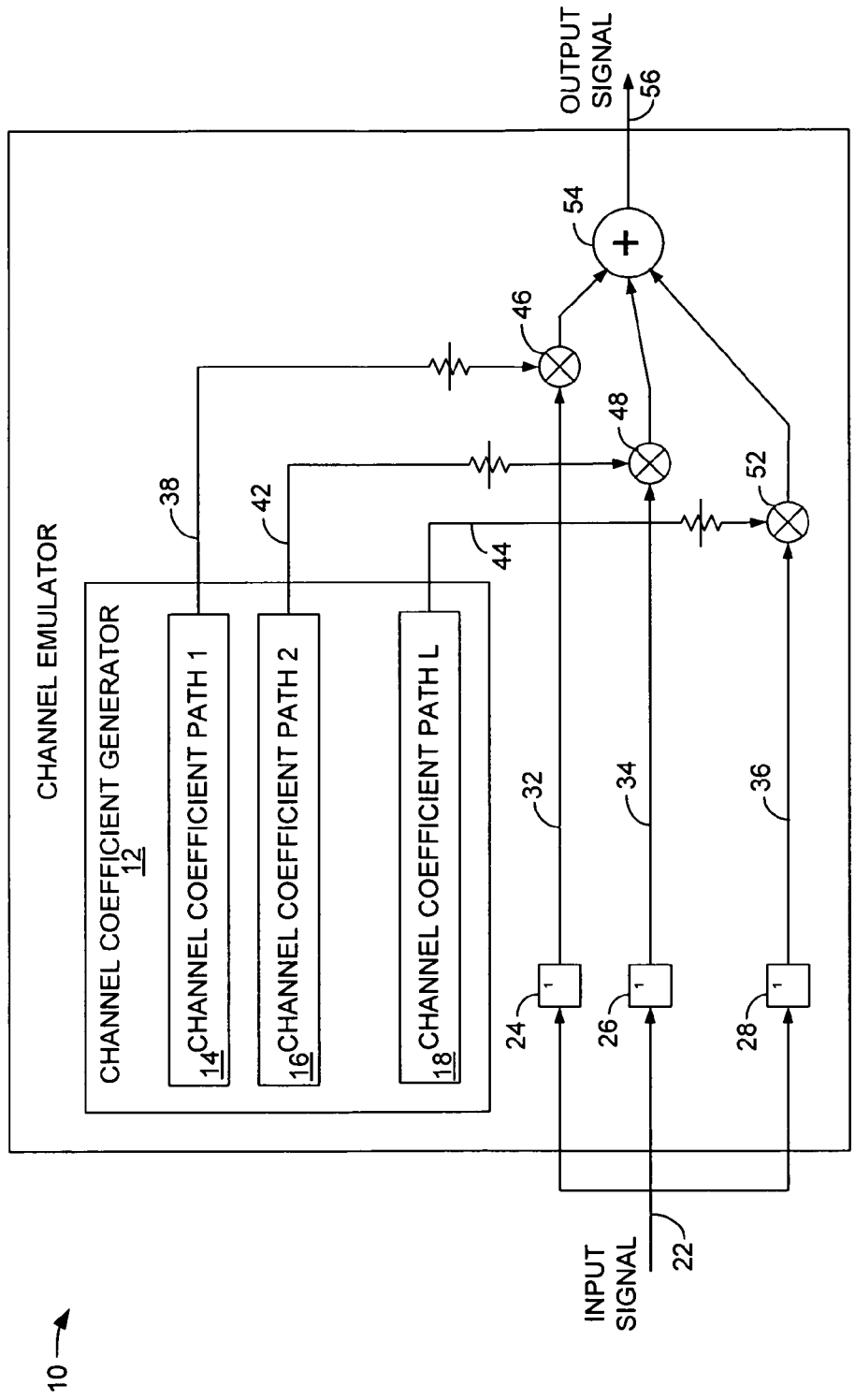
FIG. 1 is a schematic diagram illustrating a typical structure of a channel emulator.

The system and method for channel emulator performance measurement and evaluation can be implemented on any channel emulator that emulates the channel conditions of any wired or wireless communication channel. The system and method for channel emulator performance measurement and evaluation can be implemented in hardware, software, or a combination of hardware and software. When implemented in hardware, the system and method for channel emulator performance measurement and evaluation can be implemented using specialized hardware elements and logic. When the system and method for channel emulator performance measurement and evaluation is implemented fully or partially in software, the software portion can be used to precisely control the various components of the system and method for channel emulator performance measurement and evaluation. The software can be stored in a memory and executed by a suitable instruction execution system (microprocessor). The hardware implementation of the system and method for channel emulator performance measurement and evaluation can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for channel emulator performance measurement and evaluation comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

As will be described below, the system and method for channel emulator performance measurement and evaluation can evaluate the performance of a SISO (Signal Input Signal Output) channel emulator and a MIMO (Multi Input Multi Output) channel emulator.

Depending on the type of signal and interface, a channel emulator can be developed for a radio frequency (RF) application, a baseband application, a wired application, a wireless application, or any other communication channel application in which the generation of a faded signal is desirable. The term "faded signal" refers to a signal that propagates through a channel emulator to simulate the effects of the communication channel. The influence of the channel impairments on the faded signal should be evaluated as a whole when performing channel emulator performance test and measurement.

FIG. 1 is a schematic diagram illustrating a structure of a channel emulator, the performance of which can be evaluated using embodiments of the system and method for channel emulator performance measurement and evaluation. The channel emulator 10 can be implemented using hardware or software. The channel emulator 10 includes a channel coefficient generator 12, which develops a channel coefficient (14, 16, 18) for each path to be tested. The number of paths is arbitrary, and is shown as three paths in this example. The channel coefficients 14, 16 and 18 are provided over respective connection paths 38, 42 and 44 to respective combiners 46, 48 and 52. The paths 38, 42 and 44 include respective path losses. An input signal 22 is provided to each of path delay elements 24, 26, 28, associated with each path. The channel coefficient for each path experiences a path delay that is specific to the particular path. The delayed input signal from respective path delay elements 24, 26 and 28 is provided over a respective connection 32, 34 and 36, and is combined with a corresponding channel coefficient in a respective combiner 46, 48, 52. The output of the combiner 46 is a signal that represents the path delay 24 and the channel coefficient 14. The output of the combiner 48 is a signal that represents the path delay 26 and the channel coefficient 16. The output of the combiner 52 is a signal that represents the path delay 28 and the channel coefficient 18. These signals are combined in an adder 54. The output on connection 56 is the faded signal that has propagated through the channel emulator 10.

Figure 2:
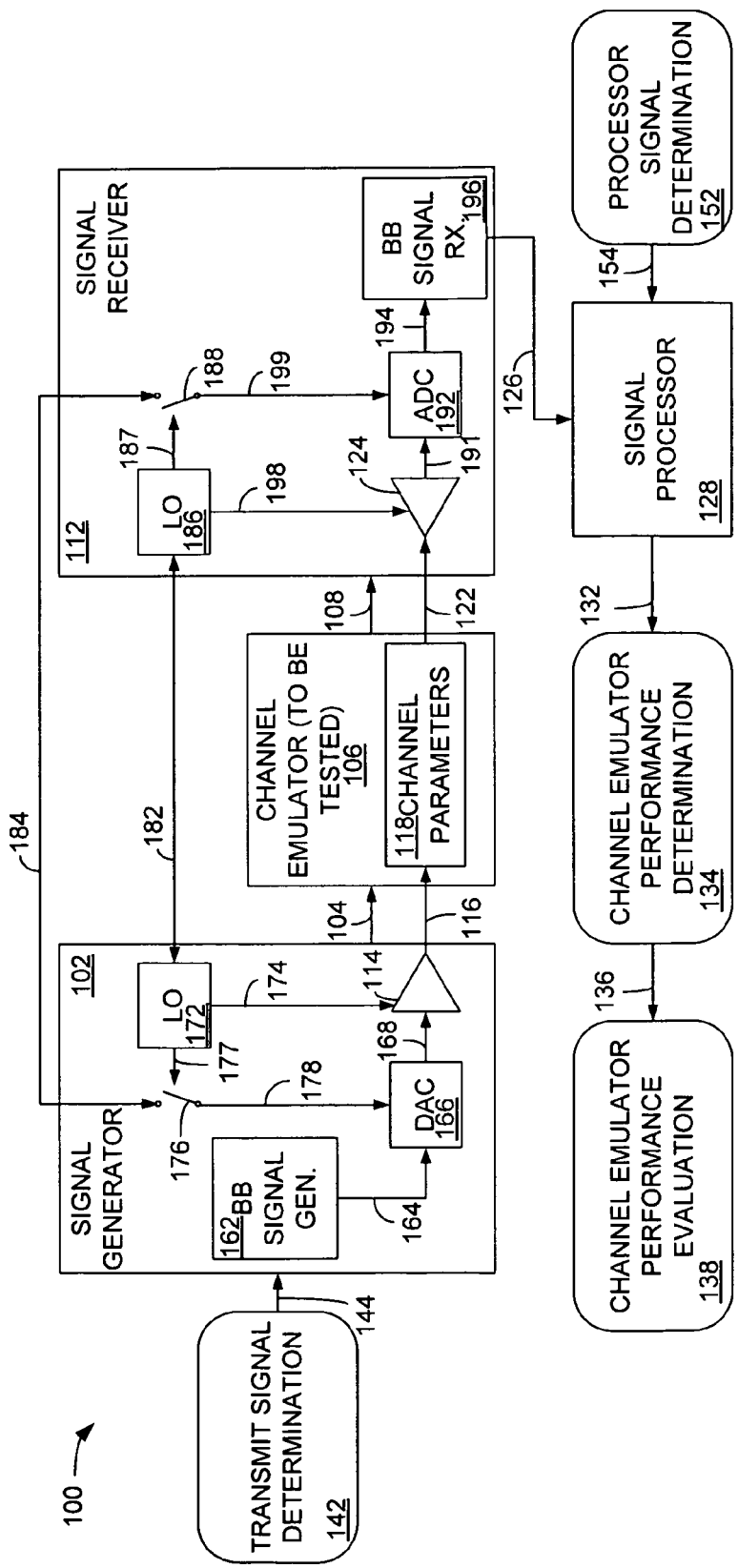
FIG. 2 is a schematic diagram illustrating an embodiment of a system and method for channel emulator performance measurement and evaluation.

FIG. 2 is a schematic diagram illustrating an embodiment of a system and method for channel emulator performance measurement and evaluation. The embodiment shown in FIG. 2 is applicable to a channel emulator that is intended to emulate the performance of a communication channel that operates in a single input, single output (SISO) application.

The measurement system 100 includes a signal generator 102, a channel emulator 106, the performance of which is sought to be tested, a signal receiver 112, and a signal processor 128. The channel emulator 106 can be similar to the channel emulator described in FIG. 1. The signal generator is shown as connected to the channel emulator 106 over connection 104 and the channel emulator 106 is connected to the signal receiver 112 over connection 108. The connections 104 and 108 are shown as general connections. Other specific connections may exist among the signal generator 102, channel emulator 106 and signal receiver 112. The signal generator 102 develops a specifically designed waveform, the generation of which is illustrated using the transmit signal determination element 142. The transmit signal determination element 142 refers to any system, method or process that can be used to develop the input signal that is provided by the signal generator 102.

The signal generator 102 includes at least one transmitter 114. The signal generator 102 also includes a baseband signal generator 162 that receives the transmit signal over connection 144. The baseband signal generator 162 provides the input signal over connection 164 to a digital-to-analog converter (DAC) 166. The DAC provides the input signal to the transmitter 114 over connection 168. The signal generator 102 also includes a local oscillator (LO) 172. The LO 172 generates a local reference frequency that controls the DAC 166 through the switch 176, and that controls the frequency of the transmitter 114 over connection 174. The switch 176 is illustrated as a single-pole, single throw switch, but can be any switching device that can be used to control the rate of the DAC based on the frequency of the LO 172.

The input signal generated according to the transmit signal determination element 142 is supplied to the signal generator 102 over connection 144. The input signal is sent from the transmitter 114 over connection 116 to a channel parameter element 118. The channel parameter element 118 alters (sometimes also referred to as fades) the input signal according to the parameters that the channel emulator 106 is attempting to emulate. For example, the channel emulator 106 may be attempting to emulate a multipath condition that may be imparted to a communication signal traversing a communication channel. The input signal is then received by a receiver 124 over link 122 in the signal receiver 112.

The signal receiver 112 also includes an analog-to-digital converter (ADC) 192 that receives the output of the receiver 124 over connection 191. The signal receiver 112 also includes a local oscillator (LO) 186. The LO 186 generates a local reference frequency that controls the ADC 192 through the switch 188, and that controls the frequency of the receiver 124 over connection 198. The switch 188 is illustrated as a single-pole, single throw switch, but can be any switching device that can be used to control the rate of the ADC 192 based on the frequency of the LO 186.

In an embodiment, the operation of the LO 172 and the operation of the LO 186 are synchronized as shown using connection 182. The synchronization of the LO 172 and the LO 186 ensure that the transmitter 114 and the receiver 124 operate in a frequency synchronized manner. Similarly, the operation of the switch 176 and the switch 188 are synchronized as shown using connection 184. The synchronization of the switch 176 and the switch 188 ensure that the sampling rate of the DAC 166 and the sampling rate of the DAC 192 operate in a synchronized manner.

The receiver 124 passes the received signal to the ADC 192. The ADC 192 digitizes the received signal and passes the received signal to a baseband signal receiver 196. The baseband signal receiver 196 passes the received signal to the signal processor 128 as a faded receive signal 126. The signal processor 128 may be any processing or computing device that can analyze the received signal. The system and method for channel emulator performance measurement and evaluation measures the overall performance of the channel emulator under anticipated communication channel conditions.

A processor signal determination element 152 provides a processor signal to the signal processor 128 over connection 154. As will be described below, depending on the configuration of the input signal provided by the transmit signal determination element 142 to the signal generator 102, the processor signal provided by the processor signal determination element 152 may be the same or different than the signal provided by the input signal determination element 142.

The channel emulator 106 that may be any type of channel emulator, or channel fader, and can be either a baseband channel emulator or a radio frequency (RF) channel emulator. Further, the channel emulator 106 can be a single path channel emulator or a multi-path channel emulator.

The signal generator 102 periodically transmits the input signal determined by the transmit signal determination element 142. The signal generator 102 can be a baseband signal generator or an RF signal generator, depending on the characteristics of the channel emulator to be measured. In an embodiment in which the channel emulator is a MIMO channel emulator, the signal generator 102 should be a multichannel signal generator, and all the channels should operate synchronously, as will be described below.

The input signal developed by the transmit signal determination element 142 is a specially designed input signal, which may be, for example, a Chirp signal, a pseudo-random number (PN) sequence, a Zadoff-Chu sequence, or any other signal that has a good autocorrelation property and, in the case of determining the performance of a MIMO channel emulator, a good orthometric, also referred to as orthogonal, or substantially orthogonal, cross-correlation property.

A Chirp signal is defined as $$s_{Chirp}(t) = a\left[\frac{t}{\tau_0}\right]\exp\{j\pi bt^2\} \qquad (1)$$

where, b is the Chirp rate, the amplitude a[t] is a rectangle envelop, and $\tau_0$ is the time duration of the Chirp signal. The Chirp rate is the instantaneous rate of change of the frequency of a waveform.

A PN sequence, also known as a Pseudo-Random Binary Sequence (PRBS), can be generated by a feedback shift register (FSR) using the typical structure shown below.

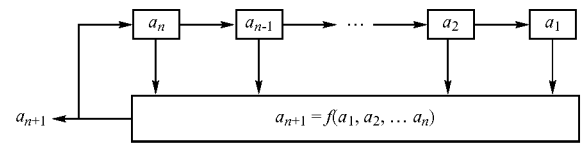

A Zadoff-Chu sequence is a polyphase code sequence which has an excellent auto-correlation property, and can be expressed as:

$$a_k = \begin{cases} e^{j\pi\frac{m}{N}k^2} & k = 0, 1, \ldots N-1, N \text{ is even} \\ e^{j\pi\frac{m}{N}k(k+1)} & k = 0, 1, \ldots N-1, N \text{ is odd} \end{cases} \qquad (2)$$

where m and N are coprime (or m=1).

Further, other signal types can be developed by the transmit signal determination element 142 and transmitted by the signal generator 102.

The term "autocorrelation" refers to a mathematical tool for finding repeating patterns, such as the presence of a periodic signal which has been obscured by noise, or identifying the missing fundamental frequency in a signal implied by its harmonic frequencies. Autocorrelation is used in signal processing for analyzing functions or series of values, such as time domain signals.

The term "cross-correlation" refers to a measure of similarity of two waveforms as a function of a time-lag applied to one of the waveforms. Cross-correlation is commonly used to search a long duration signal for a shorter, known feature.

The signal receiver 112 receives and captures the faded signal from the channel emulator 106 for further processing by the signal processor 128. The signal receiver 112 may be a baseband signal receiver or an RF signal receiver, depending on the output of the channel emulator 106. In the case of an RF signal, the signal received by the signal receiver is down-converted to baseband. The signal receiver 112 should be a multichannel receiver if the channel emulator 106 is a MIMO channel emulator and all channels should work synchronously, as will be described below.

If the input signal provided by the signal generator 102 is a Chirp signal, then the signal provided to the signal generator 102 by the input signal determination element 142 is the same as the processor signal provided to the signal processor 128 by the processor signal determination element 152.

However, if the input signal provided by the signal generator 102 is a Zadoff-Chu sequence or a PN sequence, there will be a difference between the signal provided to the signal generator 102 by the transmit signal determination element 142 and the signal provided to the signal processor 128 by the processor signal determination element 152. In such an embodiment, the processor signal provided by the processor signal determination element 152 to the signal processor 128 should be $\{a_1\}$ having a length of L, as described above, and the signal provided by the transmit signal determination element 142 to the signal generator 102 should be a sequence with the length 2L in which the term $\{a_1\}$ repeats twice, which can be shown as $\{a_1, a_2, \ldots, a_L, a_1, a_2, \ldots, a\}$.

The output of the signal processor 128 is provided over connection 132 to a channel emulator performance determination element 134. The channel emulator performance determination element 134 refers to any system, software, method or process that can be used to analyze the results of the signal processor 128 to determine the performance parameters, also referred to herein as performance indices, of the channel emulator 106. The channel emulator performance determination element 134 provides an output over connection 136 to the channel emulator performance evaluation element 138. The channel emulator performance evaluation element 138 refers to any system, software, method or process that can be used to analyze the results of the channel emulator performance determination element 134 to evaluate the performance of the channel emulator 106.

Figure 3:
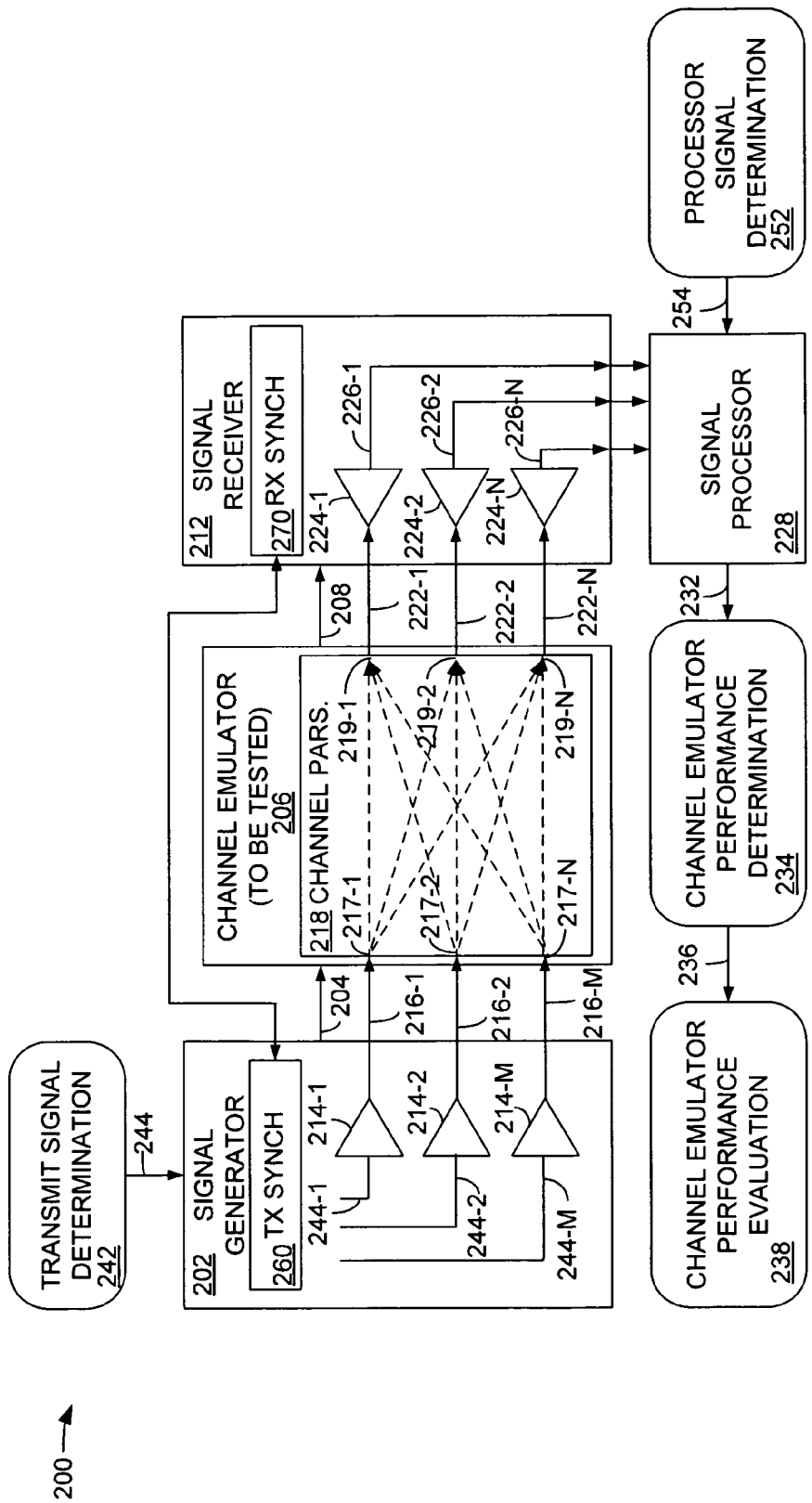
FIG. 3 is a schematic diagram illustrating an alternative embodiment of a system and method for channel emulator performance measurement and evaluation for a MIMO application.

FIG. 3 is a schematic diagram illustrating an alternative embodiment of the system and method for channel emulator performance measurement and evaluation shown in FIG. 2. The embodiment shown in FIG. 3 is applicable to a MIMO channel emulator. The elements in the system 200 are similar to the elements in the system 100 and will be referred to using the nomenclature 2XX, where the numeral XX in FIG. 3 refers to a similar element in FIG. 2. Certain elements of the embodiment shown in FIG. 3 are not shown in the figure for clarity. For example, although not shown for clarity, the signal generator 202 includes a local oscillator, a baseband signal generator and a DAC, as described above with regard to FIG. 2. For simplicity, these elements are embodied in the TX synchronization element 260. Similarly, although not shown for clarity, the signal receiver 212 includes a local oscillator, and ADC and a baseband signal receiver, as described above with regard to FIG. 2. For simplicity, these elements are embodied in the RX synchronization element 270. The TX synchronization element 260 synchronizes the operation of all transmitters 214 and the RX synchronization element 270 synchronizes the operation of all receivers 224.

The signal generator 202 is shown as connected to the channel emulator 206 over connection 204 and the channel emulator 206 is connected to the signal receiver 212 over connection 208. The channel emulator 206 can be similar to the channel emulator described in FIG. 1, but in this embodiment, is a MIMO channel emulator. The connections 204 and 208 are shown as general connections. Other specific connections may exist among the signal generator 202, channel emulator 206 and signal receiver 212. The system 200 includes a signal generator 202 having a plurality of transmitters, referred to as transmitters 214-1 through 214-M. The number of transmitters 214 is equal to the number of input ports 217 of the MIMO channel emulator 206.

The M different input signals generated according to the transmit signal determination element 242 are supplied to the signal generator 202 over connections 244-1 through 244-M, respectively. The M input signals are then supplied to all transmitters 214-1 through 214-M, respectively.

If the input signals are Chirp signals, then M different Chirp signals, each with a different chirp rate are chosen as the input signals. If the input signals are PN sequences, then M different sequences can be selected from a group of known PN sequences, as known by those skilled in the art. If the input signals are a Zadoff-Chu sequence, the number of input signals should be no more than two and the generation method of the Zadoff-Chu sequence is described below in equation (8). An advantage of using a Zadoff-Chu sequence is that the cross-correlation property of the two Zadoff-Chu sequences is much better than the cross-correlation obtained when using Chirp signals or PN sequences. However, in such an application, the number of input ports of the channel emulator to be measured will be limited to two ports.

The input signals are sent from the transmitters 214 over respective connections 216-1 through 216-M to a channel parameter element 218.

The channel emulator 206 includes input ports 217-1 through 217-N, and includes output ports 219-1 through 219-N. In a MIMO channel emulator, the number of transmitters 214, M, equals to the number of input ports 217 of the channel emulator and the number of receivers 224, N, equals to the number of output ports 219 of the channel emulator. The number of transmitters M and the number of receivers N may or may not be equal. For each transmitter 214, M and each receiver 224, N, there is a channel (channel M, N) over which the input signal traverses the channel emulator. Thus, the number of channels in a MIMO channel emulator is M×N.

As shown in FIG. 3, the signal received by any receiver (receiver N for example) is the sum of the M faded signals from transmitter 214-1 through transmitter 214-M that undergoes the fading influence of channel 1, N to channel M, N respectively. Thus, all the transmit signals from transmitter 214-1 to transmitter 214-M are the same. The M transmit signals that combine together form the received signal at receiver N. Therefore, M unique input signals are used. Each input signal corresponds to one transmitter 214, and each of the M signals are different from each other.

The channel parameter element 218 alters (sometimes also referred to as fades) the input signals according to the parameters that the channel emulator 206 is attempting to emulate. For example, the channel emulator 206 may be attempting to emulate a multipath condition that may be imparted to a communication signal traversing a communication channel. The faded signal from each output port 219 is then received by a respective receiver 224 in the signal receiver 212. In a MIMO application, it is important that all the transmitters 214-1 through 214-M should be synchronized to each other, and all the receivers 224-1 through 224-N should be synchronized to each other. The transmitters 214 are synchronized by the TX synchronization element 260 and the receivers 224 are synchronized by the RX synchronization element 270. Further, each transmitter 214 and each receiver 224 should be frequency synchronized at the frequency of the local oscillator (LO) associated with the channel emulator, as illustrated by the TX synchronization element 260 and the RX synchronization element 270. Further, the sampling rate of the digital-to-analog converter (DAC) associated with each transmitter 214 should be synchronized to the sampling rate of the analog-to-digital converter (ADC) associated with each receiver 224, as also illustrated by the TX synchronization element 260 and the RX synchronization element 270. Synchronizing the LO in the signal generator (102, 202) to the LO in the signal receiver (112, 212), and synchronizing the DAC in the signal generator (102, 202) to the ADC in the signal receiver (112, 212) removes, or substantially removes, any synchronization error between the signal generator (102, 202) and the signal receiver (112, 212) and allows the system to perform accurate data capture.

The signal receiver 212 passes the received signals to the signal processor 228. The signal processor 228 may be any processing or computing device that can analyze the received signal. The system and method for channel emulator performance measurement and evaluation measures the performance of the channel emulator under anticipated communication channel conditions.

The channel emulator 206 may be any type of channel emulator, or channel fader, and can be either a baseband channel emulator or a radio frequency (RF) channel emulator. In this embodiment, the channel emulator 206 is a MIMO channel emulator.

The signal developed by the signal generator 202 is similar to the signal developed by the signal generator 102, however; in this embodiment, the signal is designed for a MIMO application, as described above.

The output of the signal processor 228 is provided over connection 232 to a channel emulator performance determination element 234. The channel emulator performance determination element 234 refers to any system, software, method or process that can be used to analyze the results of the signal processor 228 to determine the performance parameters, also referred to herein as performance indices, of the channel emulator 206. The channel emulator performance determination element 234 provides an output over connection 236 to the channel emulator performance evaluation element 238. The channel emulator performance evaluation element 238 refers to any system, software, method or process that can be used to analyze the results of the channel emulator performance determination element 234 to evaluate the performance of the channel emulator 206.

Figure 4:
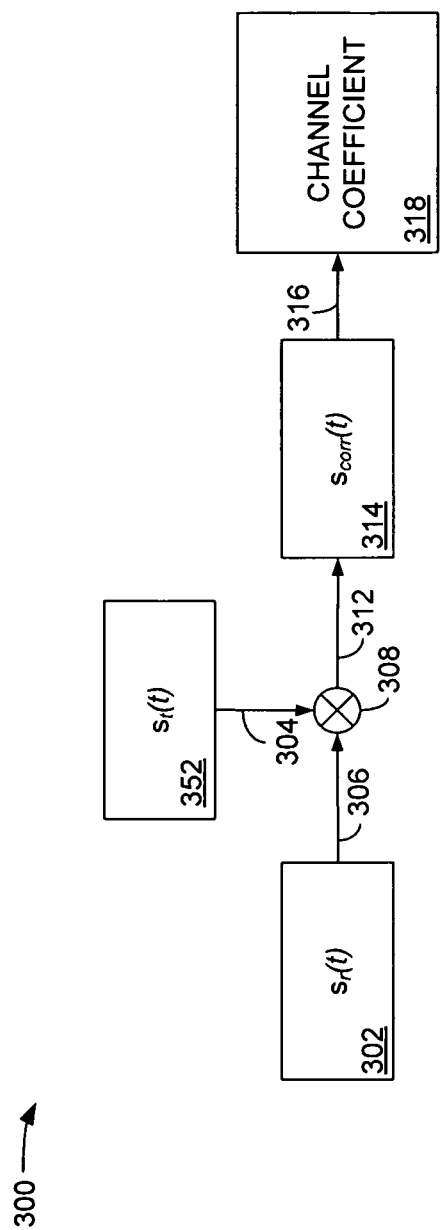
FIG. 4 is a block diagram illustrating an embodiment of the signal processor of FIG. 2.

FIG. 4 is a block diagram 300 illustrating an embodiment of the signal processor 128 of FIG. 2. The signal processor 300 is applicable to a SISO channel emulator. The received faded signal 302 $S_r(t)$ received from the signal receiver 112 is provided to a correlator 308 over connection 306. The input signal having the form $S_t(t)$, is provided from the processor signal determination element 352 over connection 304 to the correlator 308. The resulting signal output from the correlator 308 is a correlated signal having the form $S_{corr}(t)$.

$$S_{corr}(t) = S_r(t) \otimes S_t(t) \qquad (3)$$

The input signal provided by the transmit signal determination element 342 (i.e., the Chirp signal, the PN sequence or the Zadoff-Chu sequence, etc.) has a good autocorrelation property. For example, the autocorrelation property of the Chirp signal can be expressed as $$S_{Chirp}(t) \otimes S_{Chirp}(t) = \sin c(\pi b \tau_0 t) \qquad (4)$$

which can be considered to approximate a Dirac function when the bandwidth $b\tau_0$ is sufficiently large. Theoretically, a Dirac function is a function representing an infinitely sharp peak bounding unit area: a function $\delta(x)$ that has the value zero everywhere except at x=0 where its value is infinitely large in such a way that its total integral is 1.

A signal is said to exhibit a good autocorrelation property when the autocorrelation of the signal resembles an impulse signal, such as a Dirac function. The term autocorrelation is sometimes referred to as "pulse compression." The term "pulse compression" refers to a signal processing technique by which a transmitted pulse is correlated with a received signal.

Using a SISO multipath fading emulation as an example, there is one input from the transmitter 114, and one output to the receiver 124, in the channel emulator 106, as described above. However, the channel emulator 106 duplicates the input signal to a plurality of signals, L, traversing a plurality of emulation paths within the channel emulator 106. The multiple paths emulate multipath fading of the signal traversing the channel emulator. A path delay and a path loss are applied to each emulated signal. All of the signals are combined to form the faded receive signal 126/226. Because the length of the input signal is usually much larger than the path delay, it is difficult to discern from the received signal the individual signals that traverse the different paths. Using an input signal with a good autocorrelation property and correlating the faded receive signal with the input signal, results in each of the signals representing the L paths in the channel emulator being expressed as a Dirac function, thereby allowing each signal to be discerned from the faded receive signal. After the faded receive signal is correlated with the input signal, the resulting correlated signal represents the impulse response of the channel emulator.

As another non-limiting example, the autocorrelation property of a Zadoff-Chu sequence is $$x_i = \sum_{k=0}^{N-1} a_k a_{k+i}^* = \begin{cases} N & i=0 \\ 0 & i \neq 0 \end{cases} \qquad (5)$$

Figure 12:
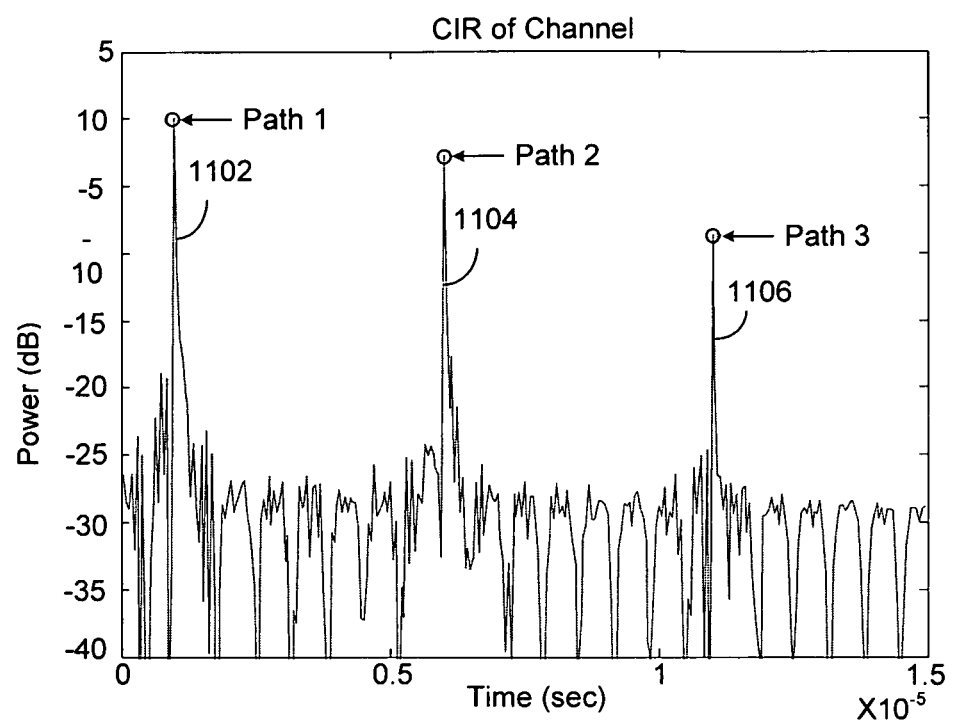
FIG. 12 is a graphical view illustrating a correlated receive signal.

Thus, the correlated signal 314, $S_{corr}(t)$, represents the channel impulse response (CIR) of the channel emulator 106. From the signal 314, $S_{corr}(t)$, the channel coefficient or coefficients of the simulated paths in channel emulator 106 can be extracted by the channel coefficient element 318 and the delay of each path can be measured. The channel coefficients are operated on using statistical analysis to extract the statistical performance of the channel emulator 106, 206. FIG. 12 is a graphical view 1100 illustrating the correlated signal 314, $S_{corr}(t)$, of a channel having three paths. The peaks 1102, 1104 and 1106 represent the three paths of the channel. The complex values of the three peaks represent the measured channel coefficients of the three paths of the channel. The path loss is normalized. The positions of the three paths on the horizontal axis only represent the interval path delay among the paths and does not represent the absolute path delay of the three paths.

Because the signal generator 102 (FIG. 2) transmits the input signal periodically, after correlation processing, the periodic channel coefficient of each path can be obtained with the same period as in the signal generator 102. Therefore, using statistical analysis on the periodic channel coefficient, the statistical performance of the channel emulator 106 can be measured.

Figure 5:
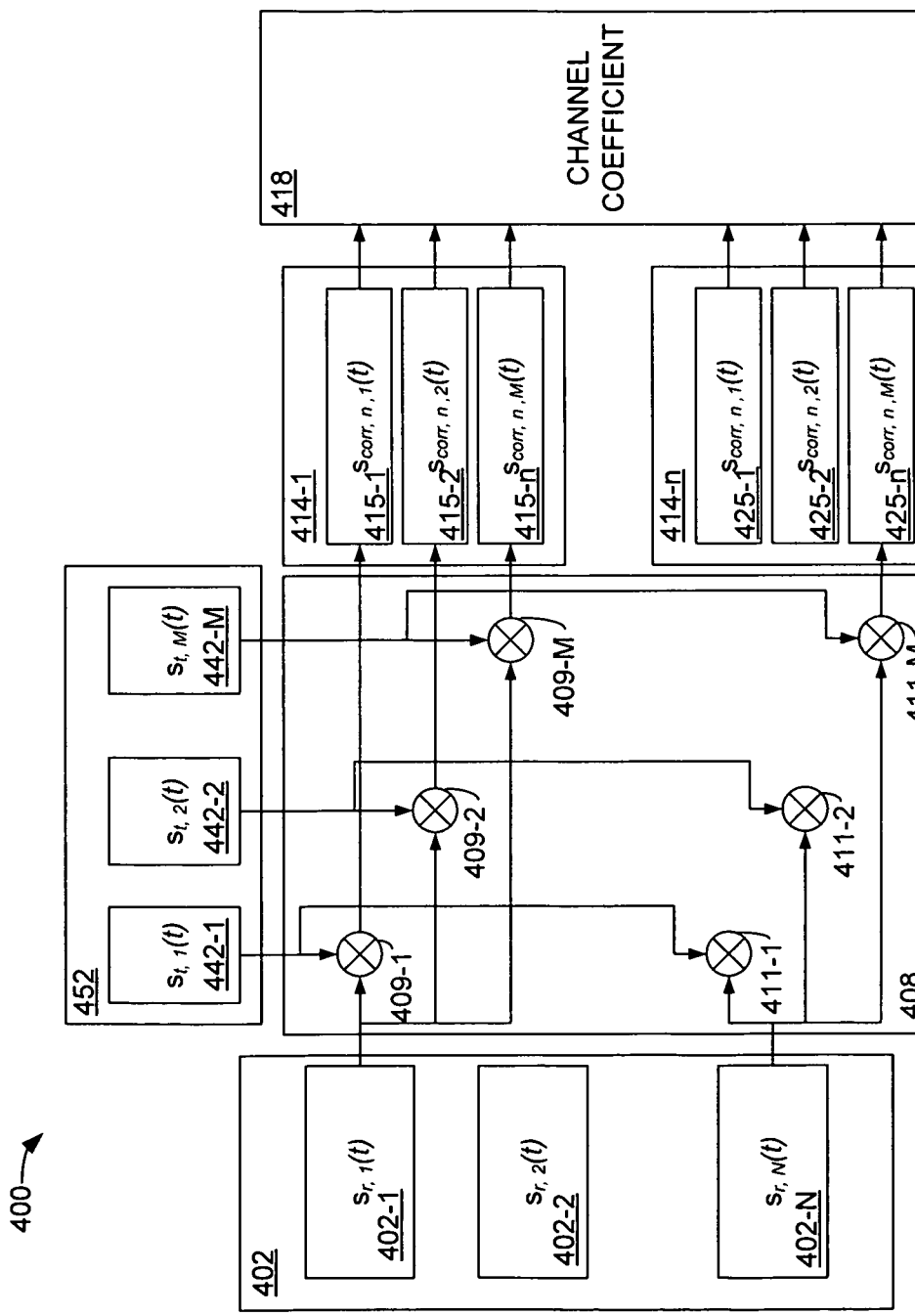
FIG. 5 is a block diagram illustrating an embodiment of the signal processor of FIG. 3.

FIG. 5 is a block diagram 400 illustrating an embodiment of the signal processor 228 of FIG. 3.

When evaluating the performance of a MIMO channel emulator (206, FIG. 3), the faded signal received from the channel emulator (206, FIG. 3) comprises several different received signals from different outputs (222-1 through 222-N, FIG. 3) of the channel emulator 206. Each received signal $S_{r,n}(t)$ is the summation of the faded signals from the different input ports (217-1 through 217-N, FIG. 3) of the channel emulator 206. Each term, $S_{r,n}(t)$, is correlated with all of the M input signals 442-1 through 442-M, $S_{t,1}(t), S_{t,2}(t), \ldots S_{t,M}(t)$, respectively, by respective correlators 409-1 through 409-M for each instance of the received signal $S_{r,n}(t)$. The correlator 408 includes multiple instances of correlation that correspond to each instance of the received signal $S_{r,n}(t)$. The correlated signal, $S_{corr,n,m}(t)$ can be defined as:

$$S_{corr,n,m}(t) = S_{r,n}(t) \otimes S_{t,m}(t), \, m=1,\ldots M, \, n=1,\ldots N \qquad (6)$$

Besides exhibiting good autocorrelation properties, the input signal developed by the transmit signal determination element 442 (i.e., the Chirp signal, the PN sequence or the Zadoff-Chu sequence, etc.) should also exhibit a substantially orthogonal cross-correlation property.

As mentioned above, the term "cross-correlation" refers to a measure of similarity of two waveforms as a function of a time-lag applied to one of the waveforms.

Two signals are said to exhibit a good cross-correlation property when the cross correlation of two signals results in a signal having a lower level than when the same two signals are individually autocorrelated.

As mentioned above, the measurement for a MIMO channel emulator uses M different input signals for $S_{t,1}(t)$, $S_{t,2}(t)$, ... $S_{t,M}(t)$. For example, when using a Chirp signal, each Chirp signal has different Chirp rate. A substantially orthogonal cross-correlation property for two different Chirp signals having an opposite Chirp rate can be shown in the following example. For example, if a Chirp signal is used as the input signal to the signal generator 202, two different Chirp signals $S_{Chirp,1}(t)$ and $S_{Chirp,2}(t)$ with different Chirp rates will cross-correlate as follows, $$\begin{cases} s_{Chirp,1}(t) = a\left[\frac{t}{\tau_0}\right]\exp\{j\pi b_1 t^2\} \\ s_{Chirp,2}(t) = a\left[\frac{t}{\tau_0}\right]\exp\{j\pi b_2 t^2\} \end{cases} \quad b_1 \neq b_2 \quad (7)$$

Figure 6:
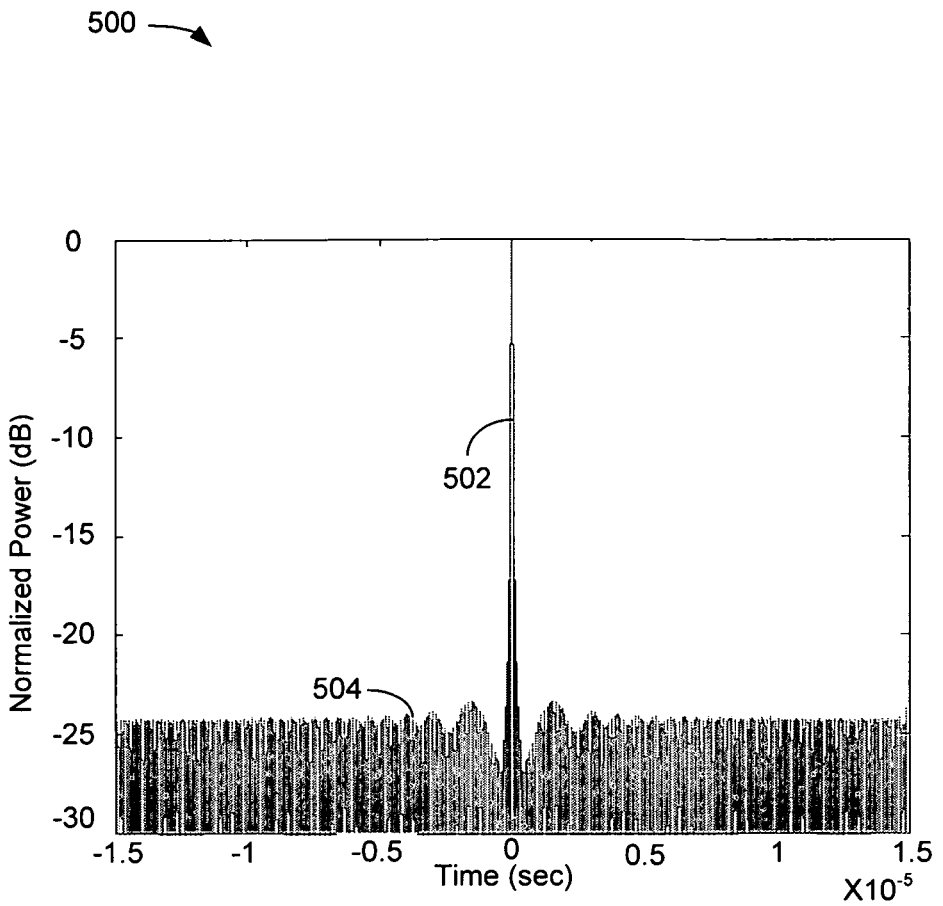
FIG. 6 is a graphical view illustrating the autocorrelation and cross-correlation of two Chirp signals used as input to the channel emulator of FIG. 3.

The autocorrelation of the signal $S_{Chirp,1}(t)$ and the cross-correlation of the signals $S_{Chirp,1}(t)$ and $S_{Chirp,2}(t)$ are shown in FIG. 6. As shown, the trace 502 represents the auto-correlation of the Chirp signal $S_{Chirp,1}(t)$, and the trace 504 represents the cross-correlation of the Chirp signals $S_{Chirp,1}(t)$ and $S_{Chirp,2}(t)$. From this non-limiting example, it is clear that the autocorrelation of $S_{Chirp,1}(t)$ is about 24 dB higher than the cross-correlation of $S_{Chirp,1}(t)$ and $S_{Chirp,2}(t)$. Thus, a faded receive signal from the channel emulator 206 can be represented as $S_{out}(t)=h_1 S_{Chirp,1}(t)+h_2 S_{Chirp,2}(t)$. After correlating with $S_{Chirp,1}(t)$ the result signal will be $$s_{corr}(t) = h_1 s_{Chirp,1}(t) \otimes s_{Chirp,1}(t) + h_2 s_{Chirp,2}(t) \otimes s_{Chirp,1}(t)$$
$$= h_1 s_1(t) + h_2 s_2(t)$$

Because the level of $S_1(t)$ is significantly higher than $S_2(t)$, $S_2(t)$ can be considered as noise and can be neglected, and $S_1(t)$ can be considered as a Dirac function, thus the coefficient of $h_1$ can be extracted from $S_{corr}(t)$.

Input signals having a good cross-correlation property are particularly useful when evaluating the performance of a MIMO channel emulator because in MIMO fading, there are a plurality of transmitters and a plurality of receivers. The faded receive signal from each receiver 224 is the combination of the signals from all the different transmitters 214. In order to separate all the signals from the different transmitters, input signals with a good cross-correlation property are used. As mentioned above, when the faded receive signal correlates with different input signals from different transmitters, the impulse response of the channel corresponding to the particular transmitter can be extracted from the resulting correlated signal.

Based on the autocorrelation and cross-correlation property of the Chirp signals, the channel coefficients from the nth input to the mth output of the channel emulator 206 can be extracted from the signal $S_{corr,n,m}(t)$. The signal $S_{corr,n,m}(t)$ is the correlation of the input signal $S_{t,m}(t)$ with the received faded signal $S_{r,n}(t)$. From the signal 414, $S_{corr,n,m}(t)$, the channel coefficients of the simulated paths in channel emulator 206 can be extracted by the channel coefficient element 418 and the delay of each path can be measured.

If a Zadoff-Chu sequence is used as the input signal $S_{t,m}(t)$ a different processing method based on two specially designed Zadoff-Chu sequences are used. This method can achieve significantly better measurement accuracy compared with using a Chirp signal or a PN sequence. An example of the Zadoff-Chu sequences for the input signal are $$a = \{a_k\} = \left\{e^{j\pi \frac{m_1}{N} k^2}, k = 0, 1, \ldots N-1\right\} \quad (8)$$
$$b = \{b_k\} = \left\{e^{j\pi \frac{m_2}{N} k^2}, k = 0, 1, \ldots N-1\right\} \quad m_2 = m_1 + \frac{N}{2}, N \text{ is even}$$

It can be shown that the cross-correlation of $\{a_k\}$ and $\{b_k\}$ is $$y_i = \sum_{k=0}^{N-1} a_k b_{k+i}^* = \begin{cases} \frac{N}{2}(1-j) & i = 0 \\ e^{j\pi \frac{m_2}{4} N} \frac{N}{2}(1+j) & i = \frac{N}{2} \\ 0 & \text{other} \end{cases} \quad (9)$$

which results in all zeros except at 0 and N/2 legs.

In this example, the input signal provided by the transmit signal determination element 242 should be $$S_{t,1}(n)=[a_0, a_1, \ldots a_{N-1}, a_0, a_1, \ldots a_{N-1}]$$
$$S_{t,2}(n)=[b_0, b_1, \ldots b_{N-1}, b_0, b_1, \ldots b_{N-1}] \quad (10)$$

Assume that the received faded signal $S_{r,n}(t)$ can be expressed as $$s_{r,n}(n) = \sum_{l=1}^{L} (s_{t,1}(n-n_l)h_{1n,l} + s_{t,2}(n-n_l)h_{2n,l}) \quad (11)$$

where $h_{m,n,l}$ is the lth path channel coefficient from input m to output n, and $n_l$ is the delay of the lth path, the maximum of $n_l$ should be less than N/2. When $s_{r,n}(n)$ correlates with sequence b, $$s_{corr,n,m}(n) = \quad (12)$$
$$s_{r,n}(n) \otimes b = \sum_{l=1}^{L}(s_{t,1}(n-n_l) \otimes b \cdot h_{11,l} + s_{t,2}(n-n_l) \otimes b \cdot h_{21,l}) =$$
$$N \sum_{l=1}^{L} \delta(n-n_l) \cdot \left(\frac{\sqrt{2}}{2} e^{-j\frac{\pi}{4}} h_{11,l} + h_{21,l}\right) +$$
$$N \sum_{l=1}^{L} \frac{\sqrt{2}}{2} e^{j\pi \frac{m_2}{4} N} e^{j\frac{\pi}{4}} \delta\left(n-n_l-\frac{N}{2}\right) \cdot h_{11,l} +$$
$$N \sum_{l=1}^{L} \delta(n-n_l-N) \cdot \left(\frac{\sqrt{2}}{2} e^{-j\frac{\pi}{4}} h_{11,l} + h_{21,l}\right) +$$
$$N \sum_{l=1}^{L} \frac{\sqrt{2}}{2} e^{j\pi \frac{m_2}{4} N} e^{j\frac{\pi}{4}} \delta\left(n-n_l-\frac{3N}{2}\right) \cdot h_{11,l}$$

The channel coefficient of $h_{11,l}$, l=1,2 ... L can be extracted from the $2^{nd}$ term in equation (12). The correlation signals are all zeros except on the path delay taps $n_l$, so the extraction precision of the channel coefficients will be significantly higher than if using a Chirp signal or a PN sequence as the input signal.

Based on the extracted channel coefficients of all the channels in the channel emulator 206, all of the performance parameters of the channel emulator can be measured. The performance parameters include the channel correlation matrix which is unique to a MIMO channel emulator.

Figure 7:
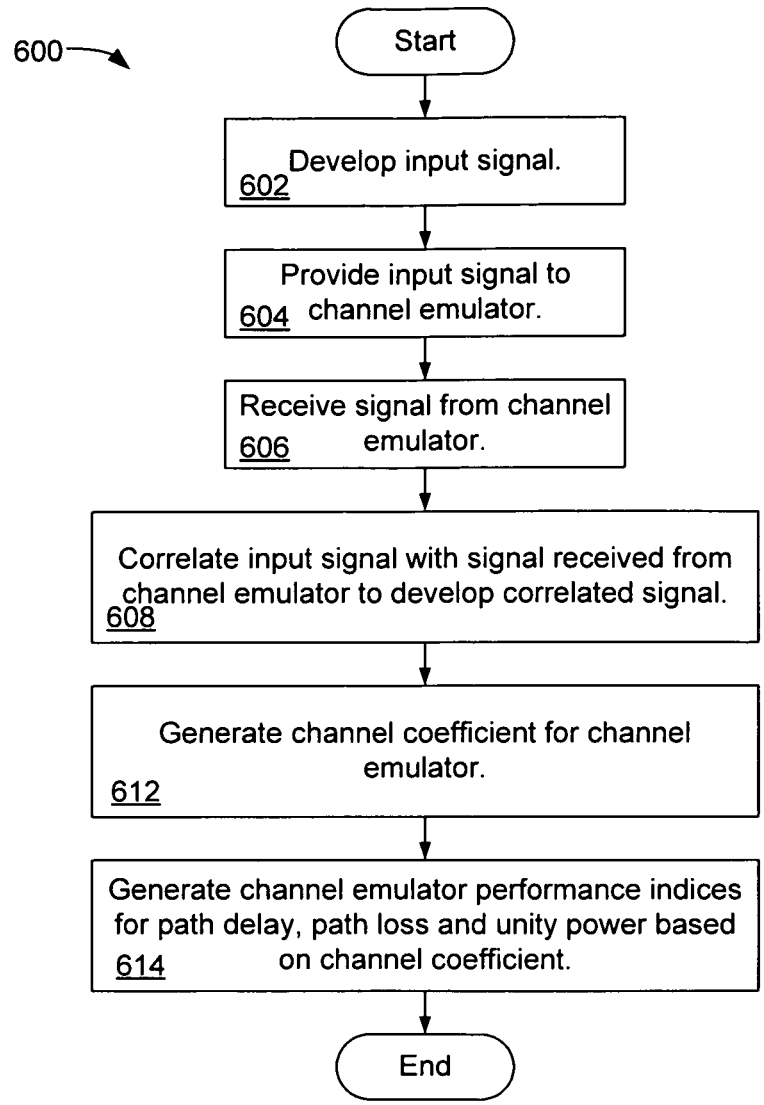
FIG. 7 is a flow chart describing an embodiment of a method for obtaining the performance indices for a channel emulator.

FIG. 7 is a flow chart describing an embodiment of a method for obtaining the performance indices for a channel emulator. In block 602, an input signal having the form $S_t(t)$, is developed by the transmit signal determination element 142. In block 604, the input signal, $S_t(t)$, is provided to the channel emulator 106. In block 606, the faded receive signal $S_r(t)$, is received from the signal receiver 112 and is provided to a correlator 308. In block 608, the input signal $S_t(t)$, is correlated with the faded receive signal $S_r(t)$, to develop the correlated signal having the form $S_{corr}(t)$.

In block 612, the channel coefficients for the channel emulator are generated by the channel coefficient element 318. In block 614, the channel emulator performance indices for path delay, path loss, unity power, correlation coefficient matrix, Rayleigh fading CPDF (Cumulative Probability Distribution Function), real & imaginary part correlation, path Auto correlation, LCR (Level Crossing Rate), Paths cross correlation, Doppler spectrum, Doppler Frequency, Log normal and Rician K factor are generated.

Example performance indices for the measured channel emulator are listed in Table 1.

TABLE 1

Performance indices in the channel emulator performance 305PDP & unity power performance

|  |  |  |
|---|---|---|
|  |  | Path delay |
|  |  | Path loss |
|  |  | Unity power |
| Correlation coefficient matrix performance |  |  |
| Rayleigh | Rayleigh fading CDF | Magnitude |
| fading | validation | Real |
| statistic |  | Imaginary |
| performance | Real & imaginary part correlation validation |  |
|  | Auto correlation validation |  |
|  | Level Crossing Rate validation |  |
|  | Paths cross correlation validation |  |
| Rayleigh fading spectral performance | Shape |  |
|  |  | Doppler frequency |
| Log normal performance |  |  |
| Rician K factor performance |  |  |

Figure 8:
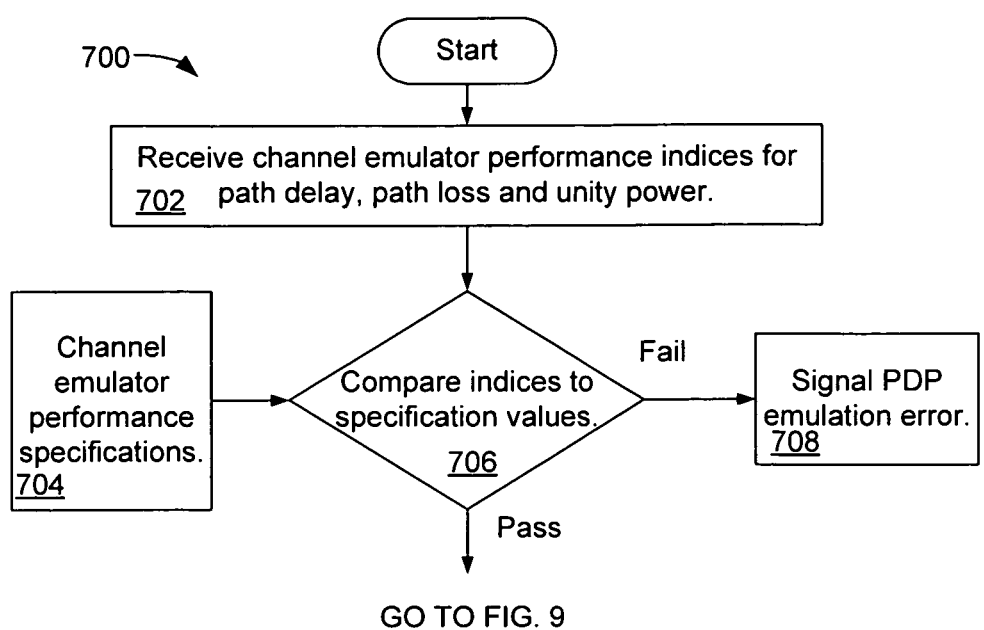
FIG. 8 is a flow chart describing an embodiment of a method for evaluating the path delay, path loss and unity power performance of the channel emulator of FIG. 2 or FIG. 3.

FIG. 8 is a flow chart describing an embodiment of a method for evaluating the power delay profile (PDP), which includes path delay and path loss, and for evaluating the unity power performance of the channel emulator of FIG. 2 or FIG. 3. The performance indices for path delay, path loss and unity power are calculated in the signal processor 128 (FIG. 2) or 228 (FIG. 3). After performing the above-described signal processing in the signal processor (128 in FIG. 2 or 228 in FIG. 3), the measured channel emulator performance indices are obtained. The methods described in FIGS. 8 through 11 describe embodiments of an evaluation method used to evaluate the performance of the channel emulator based on the measured performance indices.

In block 702, the channel emulator performance evaluation element 138 (FIG. 2, or 238 in FIG. 3) receives the path delay, path loss and unity power indices from the channel emulator performance determination element 134 (FIG. 2 or 234 in FIG. 3). In block 704, the channel emulator performance specifications are supplied. For example, the performance specifications can be defined by the user based on the expected channel emulator performance. Typically, the performance specifications are based on the channel emulator performance criteria associated with the applicable communication standard. In block 706, the path delay, path loss and unity power indices are compared with the corresponding specification values and a determination is made whether the indices equal or exceed the specification values. That is, in block 706, it is determined whether the channel emulator performance passes the performance tests. If the channel emulator passes the performance tests, the process proceeds to FIG. 9. If the channel emulator performance does not pass the tests, then in block 708, a PDP emulation error is signaled.

Figure 9:
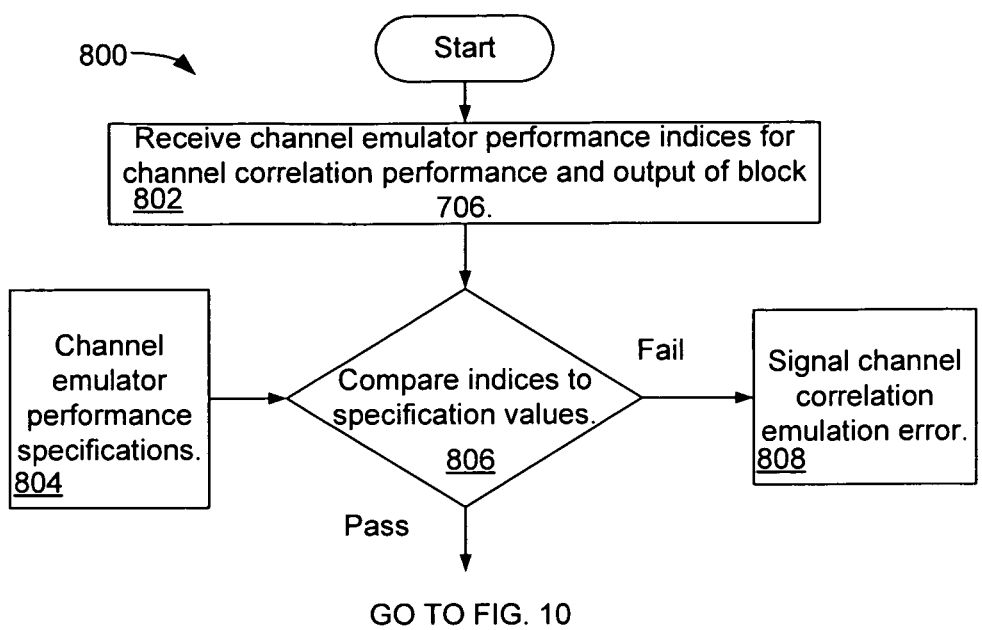
FIG. 9 is a flow chart describing an embodiment of a method for evaluating the channel correlation performance of the channel emulator of FIG. 2 or FIG. 3.

FIG. 9 is a flow chart describing an embodiment of a method for evaluating the channel correlation performance of the channel emulator of FIG. 2 or FIG. 3. In block 802, the channel emulator performance evaluation element 138 (FIG. 2, or 238 in FIG. 3) receives the channel correlation coefficients from the channel emulator performance determination element 134 (FIG. 2 or 234 in FIG. 3) and the output of block 706 of FIG. 8.

In block 804, the channel emulator performance specifications are supplied. In block 806, the channel correlation coefficients are compared with the corresponding specification values and a determination is made whether the indices equal or exceed the specification values. That is, in block 806, it is determined whether the channel emulator performance passes the performance tests. If the channel emulator passes the performance tests, the process proceeds to FIG. 10. If the channel emulator performance does not pass the tests, then in block 808, a channel correlation emulation error is signaled.

Figure 10:
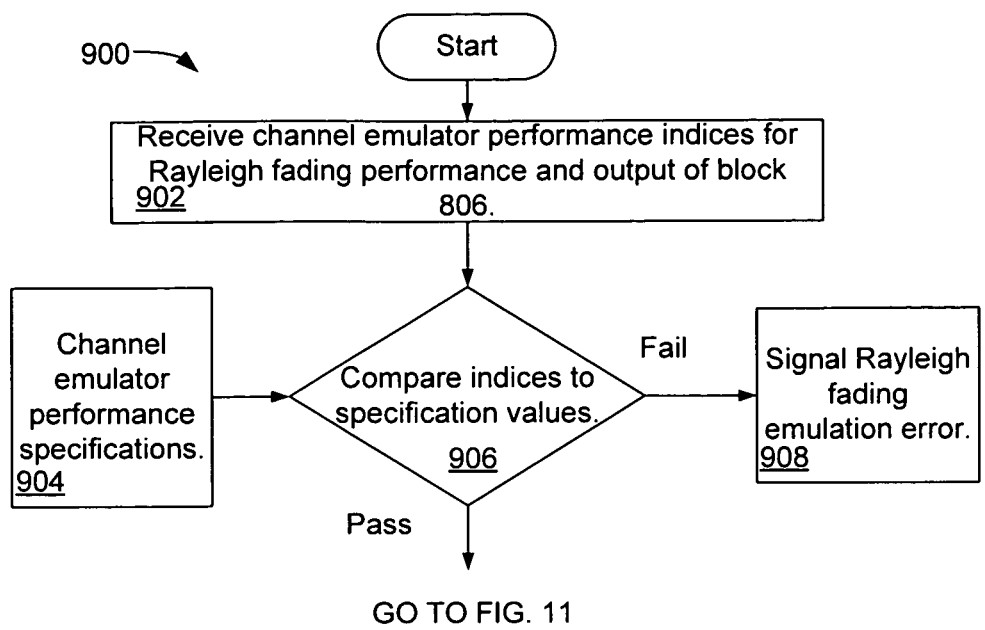
FIG. 10 is a flow chart describing an embodiment of a method for evaluating the Rayleigh fading performance of the channel emulator of FIG. 2 or FIG. 3.

FIG. 10 is a flow chart describing an embodiment of a method for evaluating the Rayleigh fading performance of the channel emulator of FIG. 2 or FIG. 3. In block 902, the channel emulator performance evaluation element 138 (FIG. 2, or 238 in FIG. 3) receives the Rayleigh fading coefficients from the channel emulator performance determination element 134 (FIG. 2 or 234 in FIG. 3) and the output of block 806 of FIG. 9.

In block 904, the channel emulator performance specifications are supplied. In block 906, the Rayleigh fading coefficients are compared with the corresponding specification values and a determination is made whether the indices equal or exceed the specification values. That is, in block 906, it is determined whether the channel emulator performance passes the performance tests. If the channel emulator passes the performance tests, the process proceeds to FIG. 1. If the channel emulator performance does not pass the tests, then in block 908, a Rayleigh fading emulation error is signaled.

Figure 11:
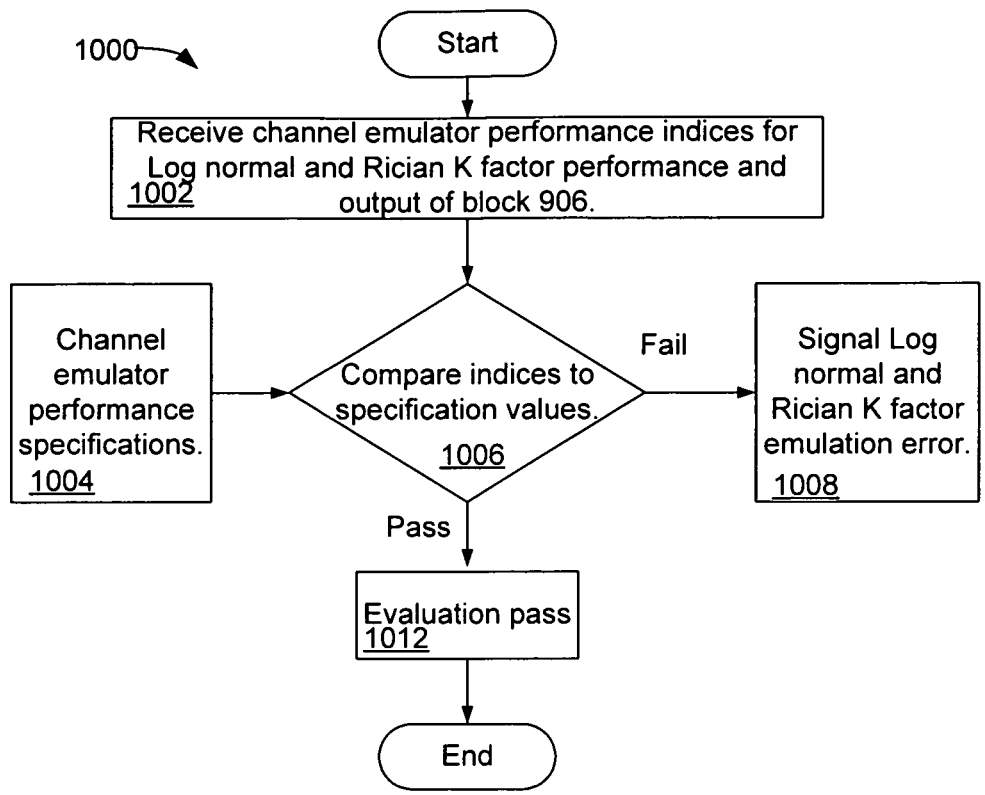
FIG. 11 is a flow chart describing an embodiment of a method for evaluating the Log normal and Rician K factor performance of the channel emulator of FIG. 2 or FIG. 3.

FIG. 11 is a flow chart describing an embodiment of a method for evaluating the Log normal and Rician K factor performance of the channel emulator of FIG. 2 or FIG. 3. In block 1002, the channel emulator performance evaluation element 138 (FIG. 2, or 238 in FIG. 3) receives the Log normal and Rician K coefficients from the channel emulator performance determination element 134 (FIG. 2 or 234 in FIG. 3) and the output of block 906 of FIG. 10.

In block 1004, the channel emulator performance specifications are supplied. In block 1006, the Log normal and Rician K factor coefficients are compared with the corresponding specification values and a determination is made whether the indices equal or exceed the specification values. That is, in block 1006, it is determined whether the channel emulator performance passes the performance tests. If the channel emulator passes the performance tests, the evaluation passing is signaled and the process ends. If the channel emulator performance does not pass the tests, then in block 1008, a Log normal and Rician K factor emulation error is signaled.

Based on the measurement system and methods described above, the performance of a real channel emulator is measured. The fading scenarios is 2×2 MIMO, 3 path, and the channel correlation is also considered.

Using a Chirp signal as the input signal, the measured path delay and path loss of channel 1 are shown in Table.2.

TABLE 2

Measured path delay and path loss using
Chirp signal measurement method
(channel 1)

| Path No. | Path delay (ns) | | Path loss (dB) | |
|---|---|---|---|---|
| | Measured | Ideal | Measured | Ideal |
| Path 1 | 0 | 0 | −2.01 | −2.04 |
| Path 2 | 4993.75 | 5000 | −5.13 | −5.04 |
| Path 3 | 9991.25 | 10000 | −11.97 | −12.04 |

The measured channel correlation coefficients are shown in Table.3

TABLE 3

Measured channel correlation coefficient using
Chirp signal measurement method

| Channel No. | Path No. | | | |
|---|---|---|---|---|
| | Path 1 | Path 2 | Path 3 | Ideal |
| C1&C2 | 0.005 | 0.014 | 0.026 | 0 |
| C1&C3 | 0.693 | 0.704 | 0.687 | 0.73 |
| C1&C4 | 0.025 | 0.008 | 0.007 | 0 |
| C2&C3 | 0.004 | 0.009 | 0.004 | 0 |
| C2&C4 | 0.732 | 0.742 | 0.728 | 0.73 |
| C3&C4 | 0.023 | 0.005 | 0.012 | 0 |

Using a Zadoff-Chu sequence as the input signal, the measured path delay and path loss of channel 1 is shown in Table.4.

TABLE 4

Measured path delay and path loss using Zadoff-Chu
sequence measurement method (channel 1)

| Path No. | Path delay (ns) | | Path loss (dB) | |
|---|---|---|---|---|
| | Measured | Ideal | Measured | Ideal |
| Path 1 | 0 | 0 | −2.09 | −2.04 |
| Path 2 | 5000.0 | 5000 | −5.00 | −5.04 |
| Path 3 | 10000.0 | 10000 | −12.11 | −12.04 |

The measured channel correlation coefficient is shown in Table.5.

TABLE 5

Measured channel correlation coefficient using
Chirp signal measurement method

| Channel No. | Path No. | | | |
|---|---|---|---|---|
| | Path 1 | Path 2 | Path 3 | Ideal |
| C1&C2 | 0.013 | 0.013 | 0.010 | 0 |
| C1&C3 | 0.733 | 0.732 | 0.732 | 0.73 |
| C1&C4 | 0.016 | 0.023 | 0.027 | 0 |
| C2&C3 | 0.022 | 0.021 | 0.021 | 0 |
| C2&C4 | 0.737 | 0.731 | 0.728 | 0.73 |
| C3&C4 | 0.051 | 0.052 | 0.058 | 0 |

The foregoing detailed description has been given for understanding exemplary implementations of the invention and no unnecessary limitations should be understood therefrom as modifications will be obvious to those skilled in the art without departing from the scope of the appended claims and their equivalents.

What is claimed is:

1. A system for determining the performance of a channel emulator, comprising:
an input signal;
at least one transmitter configured to receive the input signal, the at least one transmitter coupled to at least one receiver through the channel emulator, the at least one transmitter configured to transmit the input signal through the channel emulator, the at least one receiver configured to receive a faded receive signal; and
a signal processor configured to receive a processor signal and the faded receive signal, the signal processor configured to correlate the processor signal and the faded receive signal to develop a correlated signal that represents a channel impulse of the channel emulator, the channel impulse of the channel emulator used to extract at least one channel coefficient that reflects the performance of the channel emulator.

2. The system of claim 1, in which the input signal is chosen from a Chirp signal, a pseudo-random number (PN) sequence and a Zadoff-Chu sequence.

3. The system of claim 2, in which the Zadoff-Chu sequence comprises $$a = \{a_k\} = \left\{e^{j\pi\frac{m_1}{N}k^2}, k = 0, 1, \ldots N-1\right\}$$
$$b = \{b_k\} = \left\{e^{j\pi\frac{m_2}{N}k^2}, k = 0, 1, \ldots N-1\right\}$$
$$m_2 = m_1 + \frac{N}{2}, N \text{ is even}.$$

4. The system of claim 2, in which the channel coefficient represents an impulse response of the channel emulator based on the faded receive signal and the system further comprises logic for obtaining, based on the channel coefficient, channel performance indices chosen from path delay, path loss, unity power, correlation coefficient matrix, Rayleigh fading CPDF (Cumulative Probability Distribution Function), real & imaginary part correlation, path Auto correlation, LCR (Level Crossing Rate), paths cross-correlation, Doppler spectrum, Doppler Frequency, Log normal and Rician K factor performance.

5. The system of claim 1, in which the channel emulator is a single input, single output (SISO) channel emulator.

6. The system of claim 1, in which the channel emulator is a multiple input, multiple output (MIMO) channel emulator having a plurality of transmitters and a plurality of receivers, each transmitter being synchronized with each other transmitter, each receiver being synchronized with each other receiver, and each transmitter and each receiver configured to operate on the same local oscillator frequency and the same sampling rate, and in which the signal processor is further configured to cross-correlate the processor signal and the faded receive signal to develop a second correlated signal that represents a channel impulse of the channel emulator.

7. The system of claim 6, in which the input signal is chosen from a Chirp signal, a pseudo-random number (PN) sequence and a Zadoff-Chu sequence, and in which a different input signal is provided to each of a plurality of transmitters.

8. A system for determining the performance of a channel emulator in a multiple-input, multiple-output (MIMO) communication architecture, comprising:
a plurality of transmitters and a plurality of receivers, each transmitter being synchronized with each other transmitter, each receiver being synchronized with each other receiver, and each transmitter and each receiver configured to operate on the same local oscillator frequency and the same sampling rate;
an input signal that traverses the channel emulator and that appears at each receiver as a faded receive signal; and
a signal processor configured to receive a processor signal and one of the faded receive signals, the signal processor configured to autocorrelate the processor signal and that one of the faded receive signals, and configured to cross-correlate the processor signal and that one of the faded receive signals to develop a correlated signal that represents a channel impulse of the channel emulator, the channel impulse of the channel emulator used to extract at least one channel coefficient that reflects the performance of the channel emulator.

9. The system of claim 8, in which the input signal is chosen from a Chirp signal, a pseudo-random number (PN) sequence and a Zadoff-Chu sequence.

10. The system of claim 9, in which the Zadoff-Chu sequence comprises $$a = \{a_k\} = \left\{e^{j\pi \frac{m_1}{N} k^2}, k = 0, 1, \ldots N-1\right\}$$
$$b = \{b_k\} = \left\{e^{j\pi \frac{m_2}{N} k^2}, k = 0, 1, \ldots N-1\right\}$$
$$m_2 = m_1 + \frac{N}{2}, N \text{ is even.}$$

11. The system of claim 8, in which the channel coefficient represents an impulse response of the channel emulator based on that one of the faded receive version of the input signal and the system further comprises logic for obtaining, based on the channel coefficient, channel performance indices chosen from path delay, path loss, unity power, correlation coefficient matrix, Rayleigh fading CPDF (Cumulative Probability Distribution Function), real & imaginary part correlation, path Auto correlation, LCR (Level Crossing Rate), paths cross-correlation, Doppler spectrum, Doppler Frequency, Log normal and Rician K factor performance.

12. The system of claim 8, in which the input signal is chosen from a Chirp signal, a pseudo-random number (PN) sequence and a Zadoff-Chu sequence, and in which a different input signal is provided to each of a plurality of transmitters.

13. A method for determining the performance of a channel emulator, comprising:
generating an input signal;
providing the input signal to at least one transmitter, the at least one transmitter coupled to at least one receiver through the channel emulator;
transmitting the input signal through the channel emulator;
receiving a faded receive signal;
providing a processor signal and the faded receive signal to a signal processor;
correlating the processor signal and the faded receive signal to develop a correlated signal that represents a channel impulse of the channel emulator; and
extracting from the channel impulse at least one channel coefficient that reflects the performance of the channel emulator.

14. The method of claim 13, further comprising choosing the input signal from a Chirp signal, a pseudo-random number (PN) sequence and a Zadoff-Chu sequence.

15. The method of claim 14, in which the Zadoff-Chu sequence comprises $$a = \{a_k\} = \left\{e^{j\pi \frac{m_1}{N} k^2}, k = 0, 1, \ldots N-1\right\}$$
$$b = \{b_k\} = \left\{e^{j\pi \frac{m_2}{N} k^2}, k = 0, 1, \ldots N-1\right\}$$
$$m_2 = m_1 + \frac{N}{2}, N \text{ is even.}$$

16. The method of claim 13, in which the channel coefficient represents an impulse response of the channel emulator based on the faded receive signal and the method further comprises obtaining, based on the at least one channel coefficient, channel performance indices chosen from path delay, path loss, unity power, correlation coefficient matrix, Rayleigh fading CPDF (Cumulative Probability Distribution Function), real & imaginary part correlation, path Auto correlation, LCR (Level Crossing Rate), paths cross-correlation, Doppler spectrum, Doppler Frequency, Log normal and Rician K factor performance.

17. The method of claim 13, in which the channel emulator is a single input, single output (SISO) channel emulator.

18. The method of claim 13, in which the channel emulator is a multiple input, multiple output (MIMO) channel emulator having a plurality of transmitters and a plurality of receivers, each transmitter being synchronized with each other transmitter, each receiver being synchronized with each other receiver, and each transmitter and each receiver configured to operate on the same local oscillator frequency and the same sampling rate, and in which the processor signal and the faded receive signal are cross-correlated to develop a second correlated signal that represents a channel impulse of the channel emulator.

19. The method of claim 18, in which the input signal is chosen from a Chirp signal, a pseudo-random number (PN) sequence and a Zadoff-Chu sequence, and in which a different input signal is provided to each of a plurality of transmitters.

20. The method of claim 16, further comprising evaluating the performance of the channel emulator using the channel performance indices.

* * * * *